United States Patent
Ishikawa et al.

(10) Patent No.: US 9,588,910 B2
(45) Date of Patent: Mar. 7, 2017

(54) ELECTRONIC APPARATUS AND LINKED OPERATION METHOD

(71) Applicant: Sony Corporation, Tokyo (JP)

(72) Inventors: Hirotaka Ishikawa, Kanagawa (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/620,329

(22) Filed: Feb. 12, 2015

(65) Prior Publication Data

US 2015/0242340 A1    Aug. 27, 2015

(30) Foreign Application Priority Data

Feb. 21, 2014 (JP) ................. 2014-031602

(51) Int. Cl.
  *G06F 9/54*   (2006.01)
  *G06F 13/10*  (2006.01)
  *G06F 9/445*  (2006.01)

(52) U.S. Cl.
  CPC .............. *G06F 13/102* (2013.01); *G06F 8/61* (2013.01)

(58) Field of Classification Search
  CPC .................................. G06F 13/102; G06F 8/61
  See application file for complete search history.

(56) References Cited

U.S. PATENT DOCUMENTS

| | | | |
|---|---|---|---|
| 2003/0037180 A1* | 2/2003 | Madineni et al. | 709/321 |
| 2004/0216141 A1* | 10/2004 | Shoji et al. | 719/321 |
| 2008/0127225 A1* | 5/2008 | Mullis et al. | 719/321 |
| 2011/0055747 A1* | 3/2011 | Hua et al. | 715/771 |
| 2015/0082406 A1* | 3/2015 | Park et al. | 726/9 |
| 2015/0111558 A1* | 4/2015 | Yang | 455/418 |

* cited by examiner

*Primary Examiner* — Syed Roni
(74) *Attorney, Agent, or Firm* — Wolf, Greenfield & Sacks, P.C.

(57) ABSTRACT

There is provided an electronic apparatus that performs a linked operation with an information processing device via first driver software that is installed in the information processing device and also performs a linked operation with an external device that performs a linked operation with the information processing device via second driver software that is installed in the information processing device. A linked operation is performed with the external device when only the first driver software and second driver software are installed in the information processing device. The first driver software includes a software portion that serves as application software capable of being invoked by the second driver software.

14 Claims, 8 Drawing Sheets

ELECTRONIC APPARATUS AND LINKED OPERATION METHOD

CROSS REFERENCE TO RELATED APPLICATIONS

This application claims the benefit of Japanese Priority Patent Application JP 2014-031602 filed Feb. 21, 2014, the entire contents of which are incorporated herein by reference.

BACKGROUND

The present disclosure relates to an electronic apparatus and a linked operation method.

In recent years, various technologies for causing an information processing device and an external device to perform linked operations have been developed. For example, JP 2014-502400T discloses technology in which, when a portable device is connected to a host system in wired or wireless communication and the host system is determined not to have a driver of the portable device or a driver included in the host system is determined to be older than a driver stored in the portable device, the portable device automatically installs the driver stored therein in the host system.

SUMMARY

The technology disclosed in, for example, JP 2014-502400T, however, does not assume a linked operation of a plurality of apparatuses via an information processing device. For this reason, when there are a head-mounted display (HMD) and a watch that both perform linked operations with a smartphone, for example, if the HMD is set to perform linked operations with the watch via the smartphone, situations in which a procedure that a user has to go through to realize the linked operations becomes complicated are created.

Therefore, the present disclosure proposes a novel and improved electronic apparatus and linked operation method that can easily realize linked operations of a plurality of apparatuses via an information processing device.

According to an embodiment of the present disclosure, there is provided an electronic apparatus that performs a linked operation with an information processing device via first driver software that is installed in the information processing device and also performs a linked operation with an external device that performs a linked operation with the information processing device via second driver software that is installed in the information processing device. A linked operation is performed with the external device when only the first driver software and second driver software are installed in the information processing device. The first driver software includes a software portion that serves as application software capable of being invoked by the second driver software.

According to an embodiment of the present disclosure, there is provided a linked operation method including installing first driver software for causing an electronic apparatus to perform a linked operation with an information processing device in the information processing device, installing second driver software for causing an external device to perform a linked operation with the information processing device in the information processing device, and causing the electronic apparatus to perform a linked operation with the external device via the first and second driver software that are installed in the information processing device. The first driver software serves as application software capable of being invoked by the second driver software.

According to an embodiment of the present disclosure, as the first driver software that causes the electronic apparatus to perform a linked operation with the information processing device serves as application software that can be invoked by the second driver software that causes the external device to perform a linked operation with the information processing device, it is not necessary to install separate application software for a linked operation in the information processing device, and thereby linked operations are realized with ease.

According to one or more embodiments of the present disclosure described above, it is possible to easily realize linked operations of a plurality of apparatuses via an information processing device.

Note that the effect described above is not necessarily limited, and along with or instead of the effect, any effect that is desired to be introduced in the present specification or other effects that can be expected from the present specification may be exhibited.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. System configuration
2. Module configuration for linked operations
3. Hardware configuration
4. Supplement (1. System Configuration)

Figure 1:
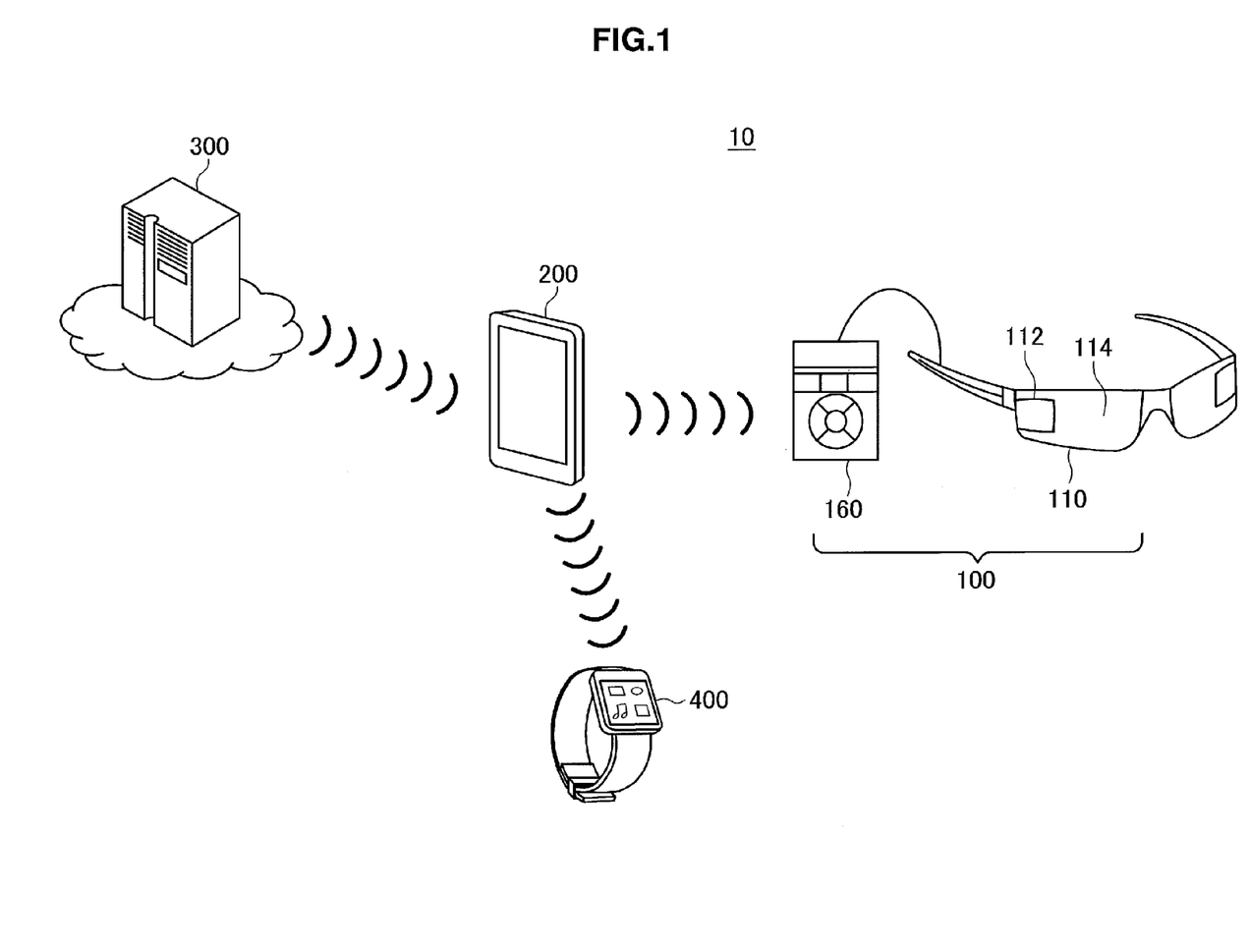
FIG. 1 is a diagram showing a schematic configuration of a system according to an embodiment of the present disclosure.
Figure 2:
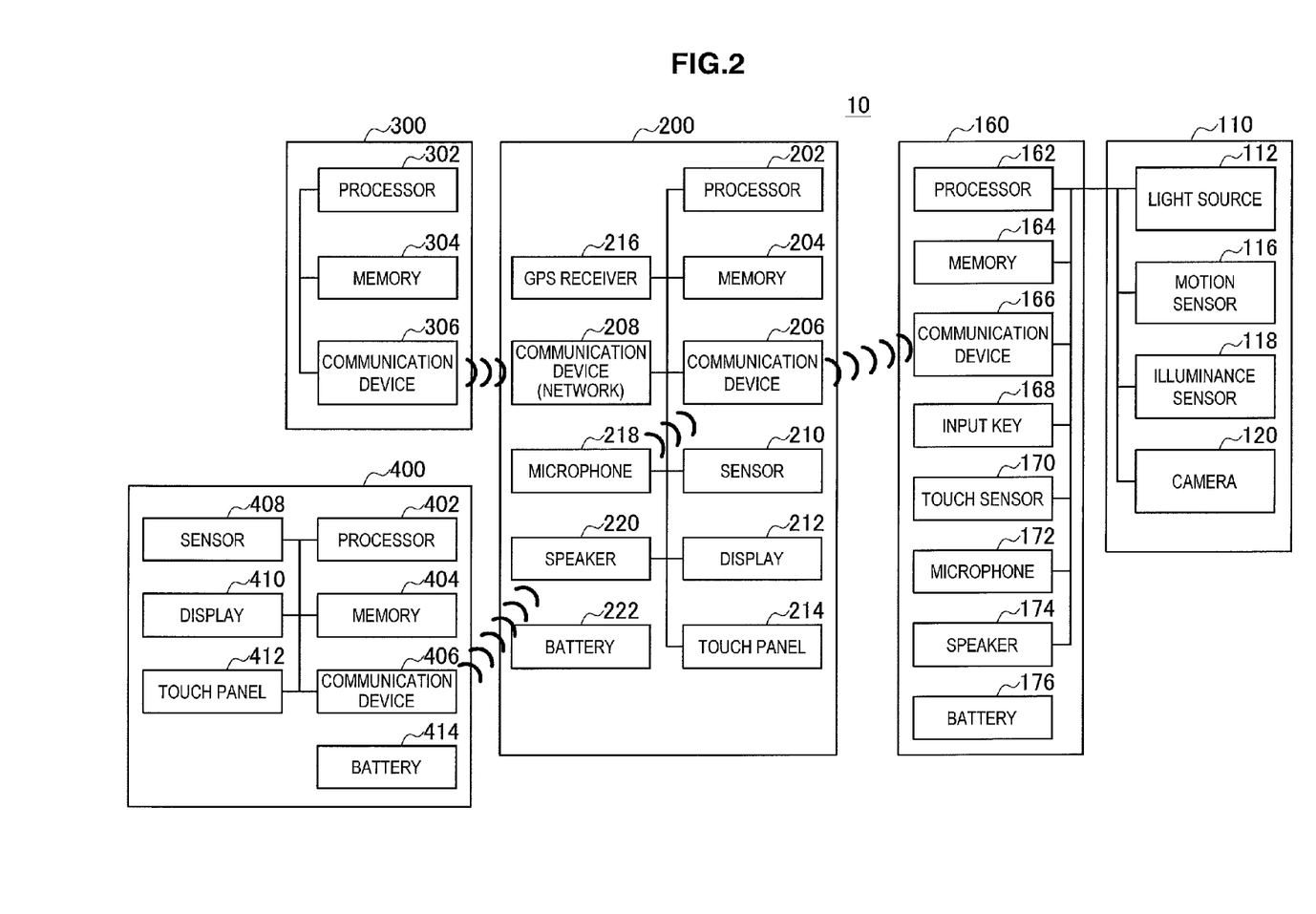
FIG. 2 is a block diagram showing a schematic functional configuration of the system shown in FIG. 1.

FIG. 1 is a diagram showing a schematic configuration of a system according to an embodiment of the present disclosure. FIG. 2 is a block diagram showing a schematic functional configuration of the system shown in FIG. 1. Referring to FIGS. 1 and 2, the system 10 includes a head-mounted display (HMD) 100, a smartphone 200, a server 300, and a watch 400. Hereinbelow, configurations of the respective devices will be described.

(Head-Mounted Display)

The HMD 100 includes a display unit 110 and a control unit 160. The display unit 110 has a housing in the shape of, for example, glasses, and is worn by a user (observer) on his or her head. The control unit 160 is connected to the display unit 110 by a cable.

The display unit 110 is provided with a light source 112 and a light guide plate 114 as shown in FIG. 1. The light source 112 emits image display light according to control of the control unit 160. The light guide plate 114 guides the image display light incident from the light source 112, and then emits the image display light to a position corresponding to the eyes of the user. The eyes of the user receive incidence of light that was incident on the light guide plate 114 from a real space and is then transmitted through the light guide plate 114, and the image display light guided from the light source 112 by the light guide plate 114. Accordingly, the user wearing the display unit 110 can perceive an image being superimposed on the real space. Note that, for the configuration for causing the image display light to be emitted from the light source 112 through the light guide plate 114, for example, the technology disclosed in JP4776285B may be used. The display unit 110 may be further provided with an optical system that is not illustrated for the configuration.

Further, the display unit 110 may be provided with a motion sensor 116, an illuminance sensor 118, and/or a camera 120 as shown in FIG. 2. The motion sensor 116 includes, for example, a triaxial acceleration sensor, a triaxial gyro sensor, and a triaxial geomagnetic sensor. Based on acceleration, an angular velocity, and a direction of the display unit 110 detected by the sensors, an attitude and a motion (displacement and rotation) of the display unit 110 can be specified. The illuminance sensor 118 detects illuminance of light incident on the display unit 110. The camera 120 photographs images of the real space. The images photographed by the camera 120 are treated as, for example, images corresponding to the visual field of the user in the real space.

The control unit 160 is provided with a processor 162, a memory 164, a communication device 166, an input key 168, a touch sensor 170, a microphone 172, a speaker 174, and a battery 176. The processor 162 operates according to programs stored in the memory 164 to realize various functions. The processor 162 transmits control signals to the display unit 110 in wired communication through a cable, and provides power for the light source 112 and the motion sensor 116. In addition, the processor 162 acquires data output from the motion sensor 116 and the camera 120 provided in the display unit 110, and executes processes based on the data.

The memory 164 stores various kinds of data for operations of the processor 162. For example, the memory 164 stores programs for the processor 162 to realize various functions. In addition, the memory 164 temporarily stores data output from the motion sensor 116 and the camera 120 of the display unit 110. The communication device 166 executes wireless communication with the smartphone 200. For the wireless communication, for example, Bluetooth (a registered trademark), Wi-Fi, or the like is used. The input key 168 includes, for example, a return key, a Push-to-Talk (PTT) key, and the like, and acquires user operations with respect to the HMD 100. The touch sensor 170 likewise acquires user operations with respect to the HMD 100. To be more specific, the touch sensor 170 acquires, for example, operations such as tapping, swiping and the like performed by a user. The microphone 172 converts sounds into audio signals, and provides the signals to the processor 162. The speaker 174 outputs sounds according to control of the processor 162. The battery 176 supplies power to the entire control unit 160 and display unit 110.

Note that a small size and light weight of the display unit 110 are intended in the HMD 100 such that the processor 162, the microphone 172, the speaker 174, the battery 176, and the like can be mounted in the control unit 160, and the display unit 110 and the control unit 160 are separated from each other, but connected with a cable. Since the control unit 160 is also carried by a user, it is desirable that it be as small and light as possible. Thus, by setting the functions realized by the processor 162 as minimum functions for controlling the display unit 110 and other functions to be realized by the smartphone 200, for example, a small size of the entire control unit 160 and battery 176 attributable to a reduction in power consumption of the processor 162 may also be attempted.

(Smartphone)

The smartphone 200 is provided with a processor 202, a memory 204, communication devices 206 and 208, a sensor 210, a display 212, a touch panel 214, a Global Positioning System (GPS) receiver 216, a microphone 218, a speaker 220, and a battery 222. The processor 202 realizes various functions as it operates according to programs stored in the memory 204. As described above, as the processor 202 realizes various functions in cooperation with the processor 162 provided in the control unit 160 of the HMD 100, the control unit 160 can be small and light. The memory 204 stores various kinds of data for operations of the smartphone 200. For example, the memory 204 stores programs for the processor 202 to realize the various functions. In addition, the memory 204 temporarily or permanently stores data acquired by the sensor 210 and the GPS receiver 216 and data transmitted to and received from the HMD 100.

The communication device 206 executes wireless communication using Bluetooth (a registered trademark), Wi-Fi, or the like with the communication device 166 provided in the control unit 160 of the HMD 100 and a communication device 406 provided in the watch 400. In addition, the communication device 208 executes network communication with the server 300. The network communication may be executed via, for example, a mobile telephone network. The sensor 210 includes, for example, an acceleration sensor, an angular velocity sensor, a geomagnetic sensor, an illuminance sensor, or the like, and detects various states of the smartphone 200. The display 212 displays various images according to control of the processor 202. The touch panel 214 is disposed on the display 212, and acquires touch operations of the user with respect to the display 212. The GPS receiver 216 receives GPS signals for measuring latitude, longitude, and altitude of the smartphone 200. The microphone 218 converts sounds into audio signals, and then provides the signals to the processor 202. The speaker 220 outputs sounds according to control of the processor 202. The battery 222 supplies power to the entire smartphone 200.

(Server)

The server 300 is provided with a processor 302, a memory 304, and a communication device 306. Note that the server 300 is realized, for example, through cooperation between a plurality of server devices on a network; however, it will be described as a hypothetical single device herein for simplification of description. The processor 302 realizes various functions as it operates according to programs stored in the memory 304. The processor 302 of the server 300 executes various information processes according to, for example, requests received from the smartphone 200, and transmits results thereof to the smartphone 200. The memory 304 stores various kinds of data for operations of the server 300. For example, the memory 304 stores programs for the processor 302 to realize the various functions. Further, the memory 304 may temporarily or continuously store data uploaded from the smartphone 200. The communication device 306 executes network communication via, for example, a mobile telephone network with the smartphone 200.

(Watch)

The watch 400 is provided with a processor 402, a memory 404, a communication device 406, a sensor 408, a display 410, a touch panel 412, and a battery 414. The watch 400 is another example of the wearable device that is worn by the user of the HMD 100. The system 10 may include a wearable device worn by the user on another part of his or her body, instead of the watch 400 or along with the watch 400.

The processor 402 operates according to programs stored in the memory 404 to realize various functions. In the present embodiment, the processor 402 transmits, for example, user operations acquired through the touch panel 412 to the smartphone 200 using the communication device 406, receives results of processes executed by the smartphone 200 based on the user operations, and then executes control of displaying them on the display 410. Alternatively, the watch 400 may perform linked operations with the HMD 100 and thereby the processor 402 may transmit user operations for operating the HMD 100 acquired through the touch panel 412 to the smartphone 200 using the communication device 406. The communication device 406 executes wireless communication with the communication device 206 provided in the smartphone 200 using Bluetooth (a registered trademark), Wi-Fi, or the like. Note that the communication device 406 may be capable of directly communicating with the communication device 166 provided in the control unit 160 of the HMD 100.

The sensor 408 includes, for example, an acceleration sensor, an angular velocity sensor, a geomagnetic sensor, an illuminance sensor, or the like, and detects various states of the watch 400. The display 410 displays various images according to control of the processor 402. The touch panel 412 is disposed on the display 410, and acquires touch operations of the user with respect to the display 410. The battery 414 supplies power to the entire watch 400.

Hereinabove, the system configuration according to an embodiment of the present disclosure has been described. Note that, in the present embodiment, the HMD 100 is an example of an electronic apparatus that is a wearable device. As described above, the HMD 100 provides images superimposed on a part of the visual field of the user by guiding image display light to the eyes of the observer using the light guide plate 114. Thus, although the term "display" is used, the HMD 100 is not necessarily a device that causes images to be formed on its display plane. Of course, an HMD of another known type such as a type of HMD in which images are formed on its display plane may be used instead of the HMD 100.

In addition, the system configuration described above is an example, and various other system configurations are also possible. For example, the HMD 100 may not necessarily have the display unit 110 and the control unit 160 separated from each other, and the entire configuration of the HMD 100 described above may be consolidated in a glasses-type housing such as the display unit 110. In addition, as described above, at least some of the functions for controlling the HMD 100 may be realized by the smartphone 200. Alternatively, the display unit 110 may also be provided with a processor and thus information processing of the HMD 100 may be realized in cooperation between the processor 162 of the control unit 160 and the processor of the display unit 110.

As another modified example, the system 10 may not include the smartphone 200, and communication may be directly executed between the HMD 100 and the watch 400, and/or the server 300. In addition, in the system 10, the smartphone 200 may be replaced by another device that can execute communication with the HMD 100, the server 300, and/or the watch 400, for example, a tablet terminal, a personal computer, a portable game device, or the like.

Figure 3:
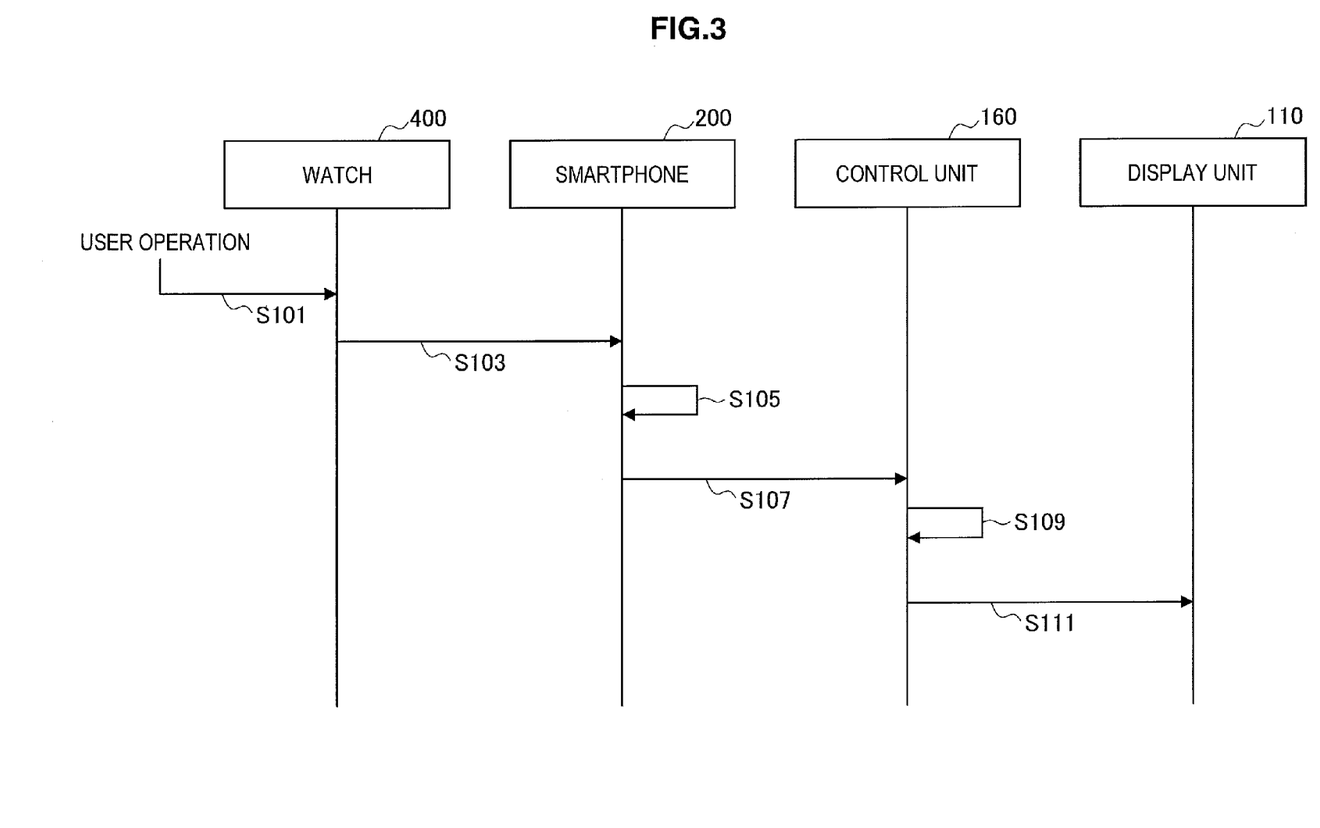
FIG. 3 is a diagram showing an example of the sequence of processes of the system according to an embodiment of the present disclosure.

FIG. 3 is a diagram showing an example of the sequence of processes of the system according to an embodiment of the present disclosure. Referring to FIG. 3, first, a user operation is input to the watch 400 via the touch panel 412 (S101). At that time, the processor 402 transmits information indicating the content of the user operation to the smartphone 200 using the communication device 406 (S103). The processor 202 of the smartphone 200 determines the content of an image to be displayed next based on the information from the watch 400 received through the communication device 206 (S105). Although not illustrated, the processor 202 may communicate with the server 300 at that time using the communication device 208 to acquire information necessary for the image to be displayed next.

Next, the processor 202 transmits the information necessary for the image to be displayed next, for example, an icon, text, or the like, to the HMD 100 using the communication device 206 (S107). The processor 162 of the HMD 100 generates the image to be displayed next (frame image) based on the information from the smartphone 200 received through the communication device 166 (S109). Further, the processor 162 controls the light source 112 of the display unit 110 based on data of the generated frame image, and thereby updates a frame of an image provided with image display light emitted from the light source 112 (S111).

Note that, although the HMD 100 provides an image based on the user operation acquired by the watch 400 in the example described above, the HMD 100 may likewise provide an image based on a user operation acquired by the touch panel 214 of the smartphone 200, or the input key 168 or the touch sensor 170 of the control unit 160 of the HMD 100.

(2. Module Configuration for Linked Operations)

Figure 4:
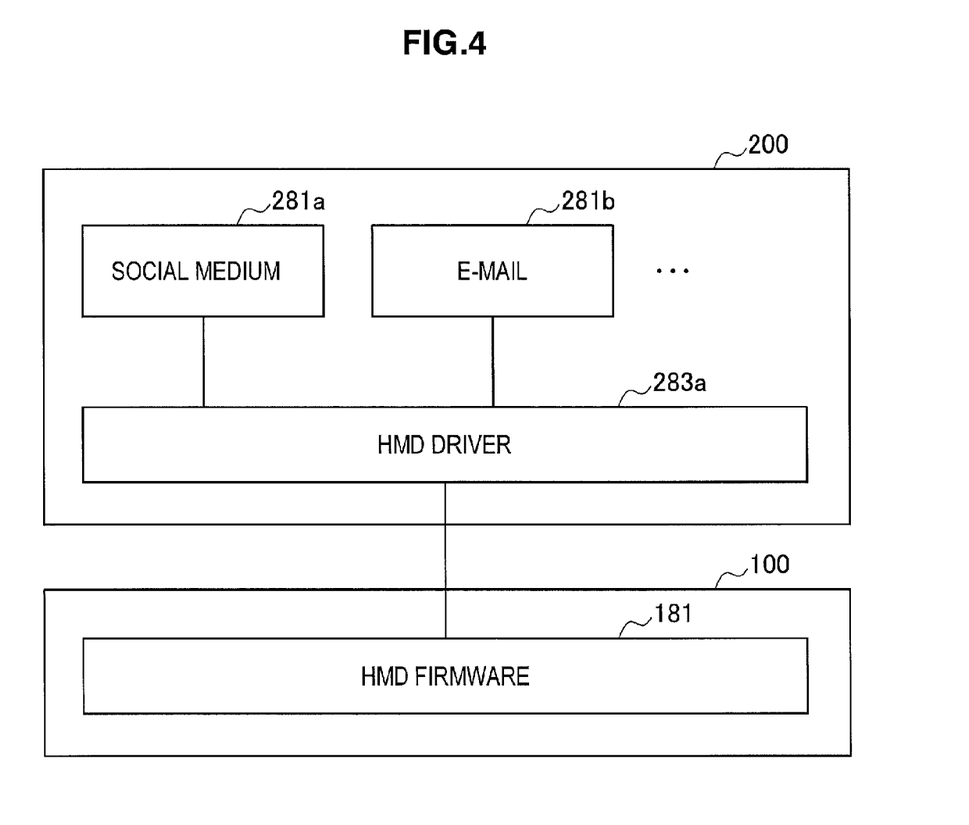
FIG. 4 is a block diagram showing a configuration example of a software module when an HMD performs linked operations with a smartphone in the system according to an embodiment of the present disclosure.
Figure 5:
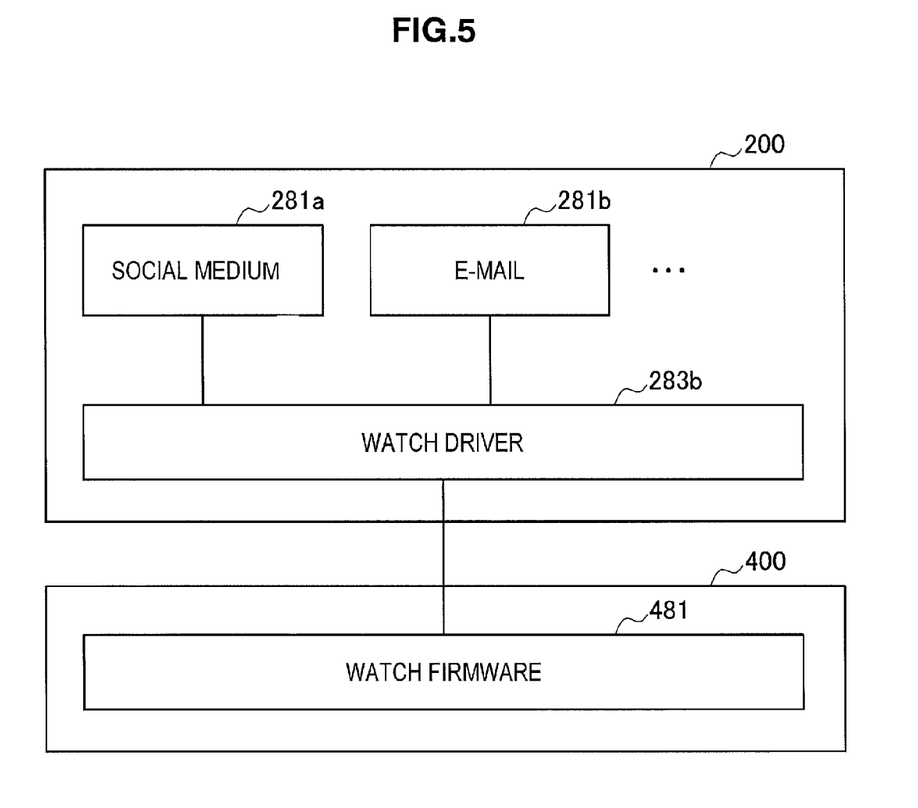
FIG. 5 is a block diagram showing a configuration example of a software module when a watch performs linked operations with the smartphone in the system according to an embodiment of the present disclosure.

FIGS. 4 and 5 are block diagrams showing configuration examples of software modules when the respective HMD 100 and watch 400 independently perform linked operations with the smartphone 200 in the system 10 according to an embodiment of the present disclosure.

Referring to FIG. 4, the software module executed by the processor 162 of the HMD 100 includes HMD firmware 181. In addition, the software module executed by the processor 202 of the smartphone 200 includes application software 281 (which will also be referred to hereinafter as App software 281) and an HMD driver 283a.

The HMD firmware 181 is a program written in the memory 164 in advance in order to control operations of the HMD 100. On the other hand, the HMD driver 283a is driver software for causing the HMD 100 and the smartphone 200 to perform linked operations. The App software 281 includes App software 281a for a social medium and App software 281b for e-mail therein in the illustrated example. The App software 281 causes the HMD 100 to provide, for example, contributions to the social medium or received messages as images, or provides a function of contributing to or transmitting text that is audibly input in the HMD 100, images photographed by the camera 120, or the like.

Here, the App software 281 of the smartphone 200 provides various functions to the HMD 100 through the HMD driver 283a. Transmission and reception of control commands and data performed between the smartphone 200 and the HMD 100 should pass through the HMD driver 283a. The HMD driver 283a provides an application programming interface (API) for the App software 281, and the respective pieces of the App software 281 can cause the HMD 100 to realize its functions by invoking the API. In addition, control commands and data transmitted from the HMD 100 are provided to the corresponding App software 281 from the HMD driver 283a. The HMD driver 283a is automatically downloaded from the server 300 and installed in the smartphone 200 when, for example, the HMD 100 is connected to the smartphone 200 for the first time.

As shown in FIG. 5 with respect to the watch 400, various functions provided by the App software 281 are realized in the watch 400 as control commands and data are transmitted and received between watch firmware 481 and a watch driver 283b of the smartphone 200, as in the HMD 100. The watch driver 283b is also automatically downloaded from the server 300 and installed in the smartphone 200 when, for example, the watch 400 is connected to the smartphone 200 for the first time.

With this configuration in which the App software 281 causes the HMD 100 or the watch 400 to realize their functions using the driver software 283 (the HMD driver 283a and the watch driver 283b) as described above, the App software 281 may not describe processes in accordance with specifications of the HMD firmware 181 and the watch firmware 481, and thus development of the software is easy. In addition, as the driver software 283 supervises transmission of control commands and data, it is possible to prevent unexpected control commands and data from being transmitted to the HMD 100 and the watch 400, and the HMD 100 and the watch 400, which are wearable devices directly related to safety of the user in some instances, can be safely used.

Figure 6:
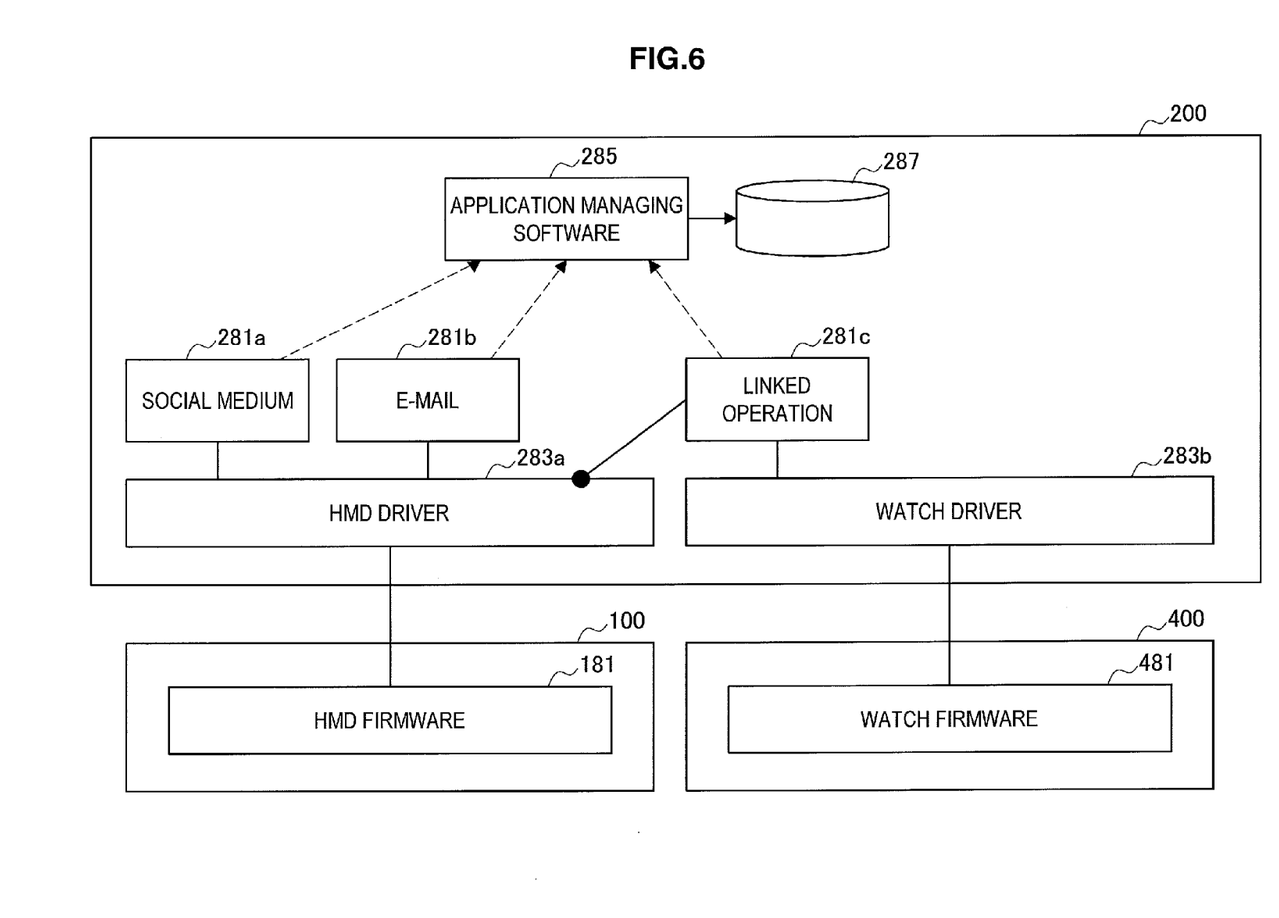
FIG. 6 is a block diagram showing a comparative configuration example in which the HMD and the watch are set to perform a linked operation in the examples shown in FIGS. 4 and 5.

FIG. 6 is a block diagram showing a comparative configuration example in which the HMD 100 and the watch 400 are set to perform a linked operation in the examples shown in FIGS. 4 and 5. Note that this comparative configuration example is shown for ease of understanding of advantages of the configuration example of the system 10 according to an embodiment of the present disclosure.

Referring to FIG. 6, a software module executed by the smartphone 200 in the comparative configuration example includes App software 281c for linked operations and application managing software 285 in addition to the HMD driver 283a, the watch driver 283b, and the App software 281a and 281b for a social medium and e-mail described in FIGS. 4 and 5 above.

The App software 281c for linked operations causes the HMD 100 and the watch 400 to perform linked operations via the smartphone 200. The App software 281c causes the HMD 100 to realize functions by invoking the API of the HMD driver 283a as the other pieces of the App software 281 does. In addition, the App software 281c operates based on control commands and data transmitted from the watch 400 and provided by the watch driver 283b. With such operations of the App software 281c, the watch 400 and the HMD 100 perform linked operations via the smartphone 200, and according to user operations performed on the touch panel 412 of the watch 400, for example, it is possible to change images to be provided to a user via the light source 112 and the light guide plate 114 of the HMD 100.

The application managing software 285 (which may be referred to hereinafter as App managing software) manages invocations of the App software 281 by the driver software 283. When the App software 281 is installed in the smartphone 200, for example, the App managing software 285 collects information regarding the respective pieces of the App software 281, and registers the collected information in a database 287. The collected and registered information can include, for example, screen sizes corresponding to the respective pieces of the App software 281, and types of sensors necessary for operations. The driver software 283 searches for the App software 281 that can be invoked from the database 287 via the App managing software 285.

Note that the App managing software 285 can function in the same way as when the respective HMD 100 and watch 400 independently perform linked operation with the smartphone 200; however, illustration and description thereof will be omitted in FIGS. 4 and 5.

In the illustrated example, as the App software 281 that can be invoked by the watch driver 283b (App software that realizes a function that the watch driver 283b desires to use), the App software 281c for linked operations is registered in the database 287. Thus, it is possible in the smartphone 200 to selectively cause the HMD 100 to perform a predetermined operation as a linked operation when a predetermined operation is executed in the watch 400. To be more specific, for a linked operation, the watch driver 283b invokes the App software 281c for linked operations, then the App software 281c invokes the API of the HMD driver 283a, and thereby the HMD 100 operates according to an operation input to the watch 400.

In the case of the comparative configuration example described above, however, the App software 281c for linked operations is necessary for causing the watch 400 and the HMD 100 to perform linked operations, in addition to the pieces of the driver software 283. Since the App software 281c is different software from the driver software 283, it should be separately downloaded in the smartphone 200 by the user. Thus, in comparison to the driver software 283 that is automatically downloaded when the HMD 100 and the watch 400 are connected to the smartphone 200, a procedure of operations that should be performed by the user to make it usable is cumbersome. Depending on cases, there is also a possibility of the user being unaware of or forgetting about presence of the App software 281c without using the function relating to the linked operations, even though the watch 400 and the HMD 100 can perform linked operations.

In addition, in the case of the comparative configuration example, the App software 281c for linked operations is not the only one that can invoke the API of the HMD driver 283a. Other pieces of the App software 281, for example, the App software 281a and 281b for a social medium and e-mail, can also invoke the API of the HMD driver 283a. Control of images provided by the HMD 100, for example, sometimes blocks the visual field of the user and affects safety of the user. Thus, when the HMD driver 283a provides the API for freely controlling images of the HMD 100 through linked operations with the watch 400, it is risky to allow a third party to freely develop and provide the other pieces of the App software 281.

Thus, in the present embodiment, by employing a module configuration to be described hereinbelow with reference to FIG. 7, it is possible to realize linked operations of the watch 400 and the HMD 100 with ease and safety.

Figure 7:
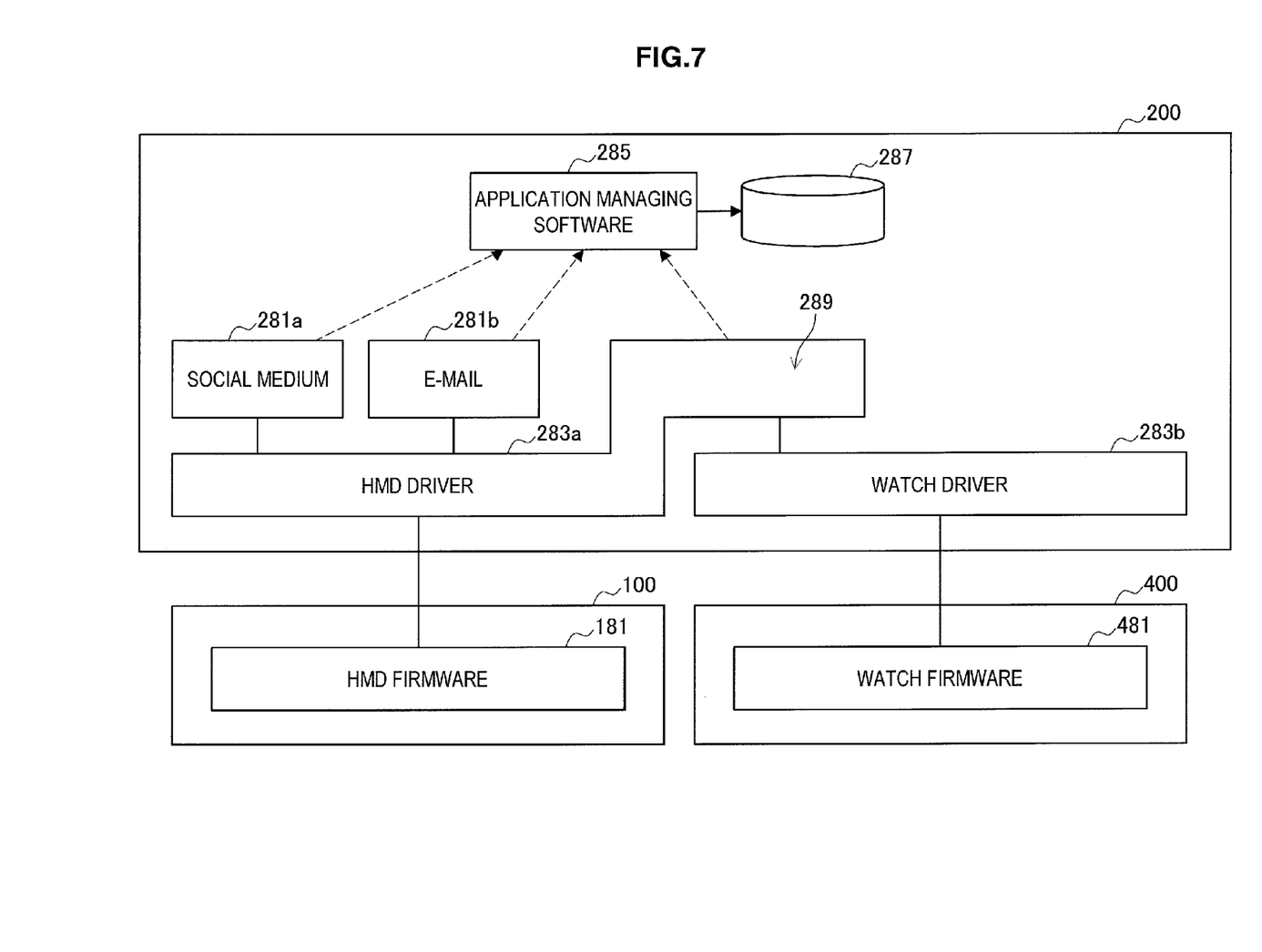
FIG. 7 is a block diagram showing a configuration example of a software module for causing the HMD and the watch to perform linked operations through the smartphone in the system according to an embodiment of the present disclosure.

FIG. 7 is a block diagram showing a configuration example of a software module for causing the HMD 100 and the watch 400 to perform linked operations via the smartphone 200 in the system 10 according to the embodiment of the present disclosure.

Referring to FIG. 7, the software module executed in the smartphone 200 in the present embodiment includes the application managing software 285 in addition to the HMD driver 283a, the watch driver 283b, and the App software 281a and 281b for a social medium and e-mail described in FIGS. 4 and 5 above. Further, in the illustrated example, a software portion 289 is included in the HMD driver 283a. Hereinbelow, description will focus on the software portion 289 that is the difference from the example of FIG. 6 described above.

The software portion 289 is a part of the HMD driver 283a. Thus, the software portion 289 is downloaded together when the HMD driver 283a is downloaded in the smartphone. The software portion 289 is a part of the driver software 283, and serves as application software that can be invoked by the driver software 283. In other words, the software portion 289 provides information to the App managing software 285, and the provided information is registered in the database 287. As described above, the provided and registered information can include corresponding screen sizes, types of sensors necessary for operations, and the like.

In the illustrated example, as the App software 281 that can be invoked by the watch driver 283b (App software that realizes a function that the watch driver 283b desires to use), the software portion 289 of the HMD driver 283a is registered in the database 287. Thus, as in the example of FIG. 6 described above, it is possible in the smartphone 200 to selectively cause the HMD 100 to perform a predetermined operation as a linked operation when a predetermined operation is executed in the watch 400. To be more specific, in the drawing, for a linked operation, the watch driver 283b invokes the software portion 289. In this case, since the software portion 289 is a part of the HMD driver 283a, it is possible to cause the HMD 100 to operate according to operation inputs to the watch 400, without using the API of the HMD driver 283a.

In order to cause the watch 400 and the HMD 100 to perform linked operations in the configuration of the present embodiment, there may be separate pieces of the driver software 283, i.e., the HMD driver 283a and the watch driver 283b. Since the software portion 289 is downloaded along with the HMD driver 283a, a separate downloading procedure by the user is not necessary, and thus there is no risk of the user not being aware of it. Thus, linked operations performed between the watch 400 and the HMD 100 can be realized more easily than in, for example, the comparative configuration example of FIG. 6.

In addition, in the configuration of the present embodiment, as the watch driver 283b invokes the software portion 289 that is a part of the HMD driver 283a, a linked operation is realized without using the API of the HMD driver 283a. For this reason, it is not necessary for the HMD driver 283a to provide the API for freely controlling images of the HMD 100 in the linked operation with the watch 400. Thus, even when a third party is allowed to freely develop and provide the other pieces of the App software 281, for example, linked operations performed between the watch 400 and the HMD 100 can be safely realized.

The configuration of the software module according to the present embodiment described above can be effective when, for example, the HMD 100 and the watch 400 are sequentially added to the system 10. To be more specific, when the watch 400 is first added to the system 10 and then the HMD 100 is added to the system 10, the watch driver 283b is not produced based on the premise of the presence of the HMD driver 283a. In such a case, rewriting the watch driver 283b so as to perform direct exchange with the HMD driver 283a to realize linked operations can also be considered; however, when the driver software 283 is installed in a client device such as the smartphone 200, updating of the software is executed with a user operation, and thus it is difficult to reliably perform updating. For example, the comparative configuration example shown in FIG. 6 (in which the driver software 283 invokes the App software 281) is effective for realizing expansion of the function without rewriting the individual pieces of the driver software 283 in such a case, but downloading separate software as described above is cumbersome, and allowing a third party to develop the App software 281 is risky.

On the other hand, in the present embodiment, the HMD driver 283a that is added later has the software portion 289 that is based on the premise of linked operations with the existing watch driver 283b. Accordingly, while the advantages of the comparative configuration example that the function can be easily expanded and the App software 281 can be developed by a third party are maintained, linked operations performed between the watch 400 and the HMD 100 can be realized with ease and safety.

Note that, although the App managing software 285 manages invocations of the App software 281 by the driver software 283 in the above-described example, an embodiment of the present disclosure is not limited thereto. As long as the driver software 283 and the App software 281 exchange information with a fixed protocol, they can realize the equivalent function without the App managing software 285.

In addition, in the above-described example, the HMD 100 is an electronic apparatus that performs linked operations with the smartphone 200 (information processing device) via the HMD driver 283a (first driver software) that is installed in the smartphone 200 and also performs linked operations with the watch 400 that performs linked operations with the smartphone 200 via the watch driver 283b (second driver software) that is installed in the smartphone 200. Here, the HMD 100 can perform linked operations with the watch 400 when only the HMD driver 283a and the watch driver 283b are installed in the smartphone 200, and the HMD driver 283a includes the software portion 289 that serves as application software that can be invoked by the watch driver 283b.

In addition, in the above-described example, the linked operation method in which the HMD driver 283a (first driver software) for causing the HMD 100 to perform linked operations with the smartphone 200 is installed in the smartphone 200, the watch driver 283*b* (second driver software) for causing the watch 400 to perform linked operations with the smartphone 200 is installed in the smartphone 200, and the HMD 100 (electronic apparatus) and the watch 400 (external device) are caused to perform linked operations using the driver software 283*a* and 283*b* installed in the smartphone 200 (information processing device) is executed. Here, the HMD driver 283*a* includes the software portion 289 that serves as application software that can be invoked by the watch driver 283*b*.

(3. Hardware Configuration)

Figure 8:
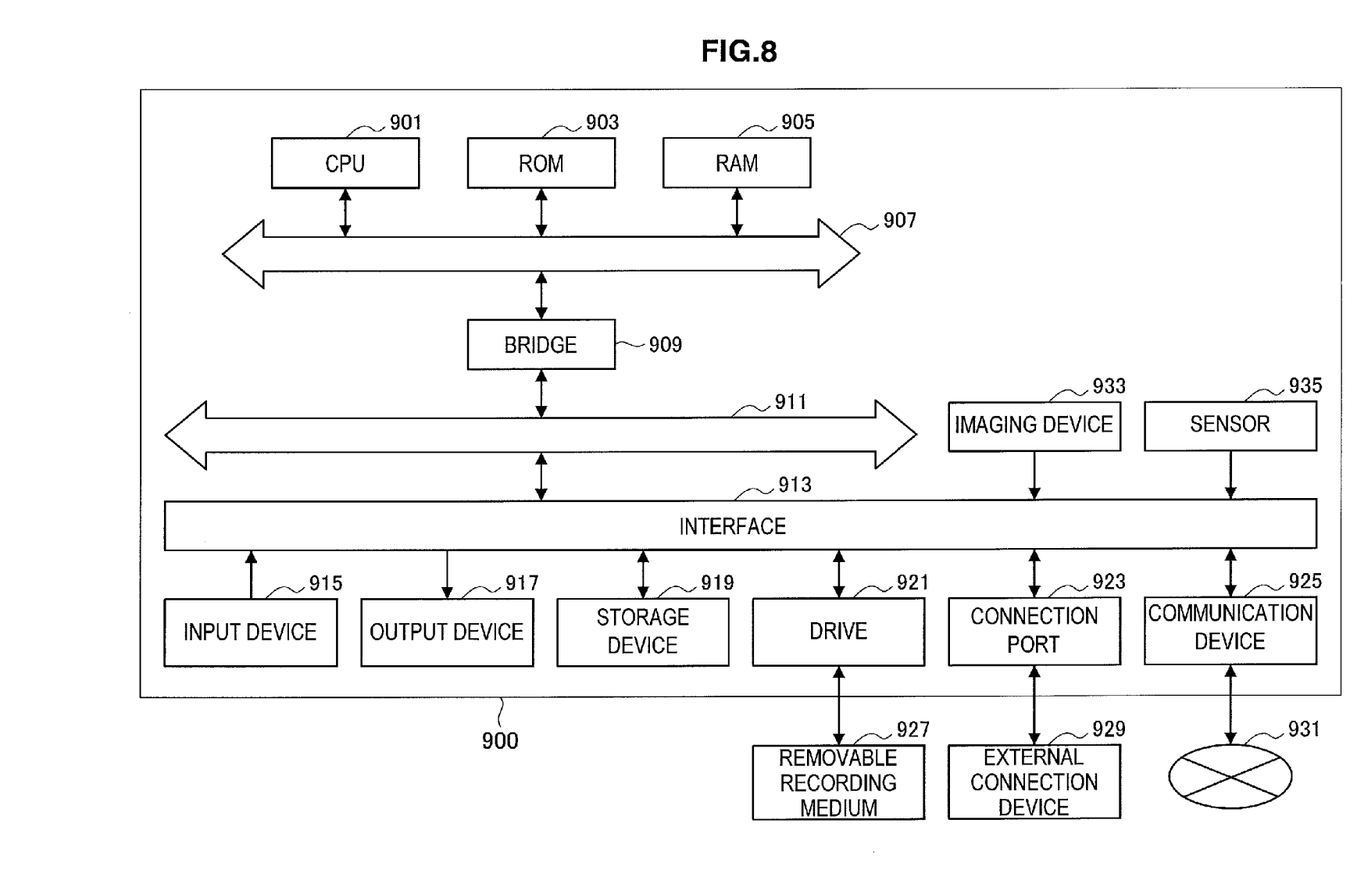
FIG. 8 is a block diagram showing an example of a hardware configuration of an electronic apparatus according to an embodiment of the present disclosure.

Next, a hardware configuration of an electronic apparatus according to an embodiment of the present disclosure will be described with reference to FIG. 8. FIG. 8 is a block diagram showing an example of the hardware configuration of the electronic apparatus according to the embodiment of the present disclosure. The illustrated electronic apparatus 900 can realize, for example, the HMD 100, the smartphone 200, the server devices constituting the server 300, and/or the watch 400 of the above-described embodiments.

The electronic apparatus 900 includes a central processing unit (CPU) 901, a read only memory (ROM) 903, and a random access memory (RAM) 905. In addition, the electronic apparatus 900 may include a host bus 907, a bridge 909, an external bus 911, an interface 913, an input device 915, an output device 917, a storage device 919, a drive 921, a connection port 923, and a communication device 925. Further, the electronic apparatus 900 may include an imaging device 933 and a sensor 935 as necessary. The electronic apparatus 900 may include a processing circuit such as a digital signal processor (DSP) or an application specific integrated circuit (ASIC), instead of or along with the CPU 901.

The CPU 901 serves as an operation processor and a controller, and controls all or some operations in the electronic apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a peripheral component interconnect/interface (PCI) bus via the bridge 909.

The input device 915 is a device which is operated by a user, for example, a mouse, a keyboard, a touch panel, buttons, switches and a lever. The input device 915 may be, for example, a remote control unit using infrared light or other radio waves, or may be an external connection device 929 such as a mobile telephone operable in response to the operation of the electronic apparatus 900. The input device 915 includes an input control circuit which generates an input signal on the basis of the information which is input by a user and outputs the input signal to the CPU 901. By operating the input device 915, a user can input various types of data to the electronic apparatus 900 or issue instructions for causing the electronic apparatus 900 to perform a processing operation.

The output device 917 is configured as a device capable of visually or audibly notifying the user of acquired information. The output device 917 can be, for example, a display device such as a liquid crystal display (LCD), a plasma display panel (PDP), and an organic electro-luminescence (EL) display, an audio output device such as a speaker or a headphone, and a printer. The output device 917 may output the results obtained from the process of the electronic apparatus 900 in a form of text or a video such as an image, and an audio such as voice or sound.

The storage device 919 is a device for data storage which is configured as an example of a storage unit of the electronic apparatus 900. The storage device 919 is configured by, for example, a magnetic storage device such as a hard disk drive (HDD), a semiconductor storage device, an optical storage device, or a magneto-optical storage device. The storage device 919 stores programs to be executed by the CPU 901, various kinds of data, and various kinds of data obtained from the outside.

The drive 921 is a reader-writer for the removable recording medium 927 such as a magnetic disk, an optical disc, a magneto-optical disc, or a semiconductor memory, and is embedded in the electronic apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the electronic apparatus 900. The connection port 923 can be, for example, a universal serial bus (USB) port, an IEEE1394 port, and a small computer system interface (SCSI) port. The connection port 923 may further include an RS-232C port, an optical audio terminal, a High-Definition Multimedia Interface (HDMI (registered trademark)) port, and so on. The connection of the external connection device 929 to the connection port 923 makes it possible to exchange various data between the electronic apparatus 900 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB) or the like. In addition, the communication device 925 may be a router for optical communication, a router for asymmetric digital subscriber line (ADSL), a modem for various kinds of communication, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates captured images by imaging a real space using an image sensor such as a charge-coupled device (CCD) or a complementary metal-oxide-semiconductor (CMOS) sensor, as well as various members such lenses for controlling the formation of a subject image on the image sensor. The imaging device 933 may be a device that takes still images, and may also be a device that takes moving images.

The sensor 935 is any of various sensors, for example, an acceleration sensor, a gyro sensor, a geomagnetic sensor, an optical sensor, and a sound sensor. The sensor 935 acquires information regarding the state of the electronic apparatus 900, such as the orientation of the case of the electronic apparatus 900, as well as information regarding the environment surrounding the electronic apparatus 900, such as the brightness or noise surrounding the electronic apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the electronic apparatus 900. Each of the above components may be realized using general-purpose members, but may also be realized in hardware specialized in the function of each component. Such a configuration may also be modified as appropriate according to the technological level at the time of the implementation.

(4. Supplement)

The embodiments of the present disclosure may include the electronic apparatus, the system, the method executed in the electronic apparatus or the system, the program for causing the electronic apparatus to function, and the non-transitory tangible medium having the program recorded thereon, which have been described above, for example.

It should be understood by those skilled in the art that various modifications, combinations, sub-combinations and alterations may occur depending on design requirements and other factors insofar as they are within the scope of the appended claims or the equivalents thereof.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1) An electronic apparatus that performs a linked operation with an information processing device via first driver software that is installed in the information processing device and also performs a linked operation with an external device that performs a linked operation with the information processing device via second driver software that is installed in the information processing device,
wherein a linked operation is performed with the external device when only the first driver software and second driver software are installed in the information processing device, and
wherein the first driver software includes a software portion that serves as application software capable of being invoked by the second driver software.

(2) The electronic apparatus according to (1), wherein the first driver software is automatically installed in the information processing device when the electronic apparatus is connected to the information processing device for the first time.

(3) The electronic apparatus according to (2), wherein the second driver software is automatically installed in the information processing device when the external device is connected to the information processing device for the first time.

(4) The electronic apparatus according to any one of (1) to (3), wherein the electronic apparatus is a wearable device.

(5) The electronic apparatus according to (4), wherein the wearable device provides an image superimposed on a part of a visual field of a user.

(6) A linked operation method including:
installing first driver software for causing an electronic apparatus to perform a linked operation with an information processing device in the information processing device;
installing second driver software for causing an external device to perform a linked operation with the information processing device in the information processing device; and
causing the electronic apparatus to perform a linked operation with the external device via the first and second driver software that are installed in the information processing device.

What is claimed is:

1. An electronic apparatus that performs a linked operation with an information processing device via first driver software that is installed in the information processing device and also performs a linked operation with an external device that performs a linked operation with the information processing device via second driver software that is installed in the information processing device,
wherein a linked operation is performed with the external device based on communication directly between the first driver software and the second driver software rather than indirectly through a third party application separate from the first driver software, and
wherein the first driver software includes:
a device driver configured to provide control commands to the electronic apparatus; and
at least one software application configured to be invoked by the second driver software, different from the device driver.

2. The electronic apparatus according to claim 1, wherein the first driver software is automatically installed in the information processing device when the electronic apparatus makes an initial connection with the information processing device.

3. The electronic apparatus according to claim 2, wherein the second driver software is automatically installed in the information processing device when the external device makes the initial connection with the information processing device.

4. The electronic apparatus according to claim 1, wherein the electronic apparatus is a wearable device.

5. The electronic apparatus according to claim 4, wherein the wearable device provides an image superimposed on a part of a visual field of a user.

6. The electronic apparatus according to claim 1, wherein the linked operation prevents unsafe control of the electronic apparatus by using the communication directly between the first driver software and the second driver software rather than indirectly through the third party application separate from the first driver software.

7. A linked operation method comprising:
installing first driver software in an information processing device, the first driver software configured to cause an electronic apparatus to perform a linked operation with the information processing device;
installing second driver software in the information processing device, the second driver software configured to cause an external device to perform a linked operation with the information processing device; and
causing the electronic apparatus to perform a linked operation with the external device based on communication directly between the first driver software and the second driver software rather than indirectly through a third party application separate from the first driver software, the linked operation with the external device being performed using:

at least one software application included within the first driver software; and a device driver included within the first driver software, different from the at least one software application, configured to provide control commands to the electronic apparatus.

8. The method according to claim 7, wherein the information processing device is a mobile telephone and the electronic apparatus is a head mounted display.

9. The method according to claim 8, wherein the external device is a wearable device.

10. The method according to claim 7, wherein the linked operation prevents unsafe control of the electronic apparatus by using the communication directly between the first driver software and the second driver software rather than indirectly through the third party application separate from the first driver software.

11. A system, comprising:

an electronic apparatus;

an external device; and an information processing device comprising first driver software configured to perform linked operations with the electronic apparatus, and second driver software configured to perform linked operations with the external device, wherein the electronic apparatus is configured to perform a linked operation with the external device based on communication directly between the first driver software and the second driver software of the information processing device rather than indirectly through a third party application separate from the first driver software, and wherein the first driver software includes:

a device driver configured to provide control commands to the electronic apparatus; and at least one software application configured to be invoked by the second driver software, different from the device driver.

12. The system according to claim 11, wherein the information processing device is a mobile telephone and the electronic apparatus is a head mounted display.

13. The system according to claim 12, wherein the external device is a wearable device.

14. The system according to claim 11, wherein the linked operation prevents unsafe control of the electronic apparatus by using the communication directly between the first driver software and the second driver software rather than indirectly through the third party application separate from the first driver software.

* * * * *